US008893050B2

(12) United States Patent
Bogner et al.

(10) Patent No.: US 8,893,050 B2
(45) Date of Patent: Nov. 18, 2014

(54) ASSEMBLY AND OUTPUT OF USER-DEFINED GROUPINGS

(75) Inventors: Matthew Robert Bogner, Austin, TX (US); Dietmar Noll, Bad Soden-Salm (DE)

(73) Assignee: International Business Machines Corporation, Armonk, NY (US)

( * ) Notice: Subject to any disclaimer, the term of this patent is extended or adjusted under 35 U.S.C. 154(b) by 1378 days.

(21) Appl. No.: 12/352,474

(22) Filed: Jan. 12, 2009

(65) Prior Publication Data

US 2010/0180230 A1 Jul. 15, 2010

(51) Int. Cl.
*G06F 3/048* (2013.01)
*G06F 3/0481* (2013.01)

(52) U.S. Cl.
CPC .................................. *G06F 3/0481* (2013.01)
USPC ............ 715/853; 715/810; 715/854; 715/843

(58) Field of Classification Search
USPC ........................... 715/810, 764, 735, 854, 853
See application file for complete search history.

(56) References Cited

U.S. PATENT DOCUMENTS

| | | | |
|---|---|---|---|
| 5,276,789 A | 1/1994 | Besaw et al. | |
| 5,295,244 A | 3/1994 | Dev et al. | |
| 5,684,967 A | 11/1997 | McKenna et al. | |
| 5,805,819 A | 9/1998 | Chin et al. | |
| 6,025,843 A * | 2/2000 | Sklar | 715/841 |
| 6,078,324 A | 6/2000 | Phathayakorn et al. | 345/348 |
| 6,271,846 B1 * | 8/2001 | Martinez et al. | 715/854 |
| 6,477,572 B1 | 11/2002 | Elderton et al. | |
| 6,931,625 B1 | 8/2005 | Coad et al. | 717/109 |
| 6,952,208 B1 | 10/2005 | Arqui et al. | 345/440 |
| 7,058,545 B2 * | 6/2006 | Chang et al. | 702/186 |
| 7,315,985 B1 | 1/2008 | Gauvin et al. | 715/734 |
| 7,549,077 B2 * | 6/2009 | White et al. | 714/4.12 |
| 2007/0061745 A1 * | 3/2007 | Anthony et al. | 715/764 |
| 2007/0186183 A1 * | 8/2007 | Hudson, Jr. | 715/810 |
| 2009/0083675 A1 * | 3/2009 | Gofer et al. | 715/853 |
| 2009/0249213 A1 * | 10/2009 | Murase et al. | 715/735 |
| 2009/0319562 A1 * | 12/2009 | Holm-Petersen et al. | 707/103 R |

OTHER PUBLICATIONS

Liu, H. et al., "Visualization in Network Topology Optimization" Proceedings of the 1992 ACM Annual Conference on Communications; 1992.

Biemann, C. et al., "Automatically Building Concept Structures and Displaying Concept Trails for Use in Brainstorming Sessions and Content Management" Innovative Internet Community Systems, Lecture Notes in Computer Science, vol. 3473/2006; 2006.

* cited by examiner

*Primary Examiner* — Omar Abdul-Ali
*Assistant Examiner* — Sherrod Keaton
(74) *Attorney, Agent, or Firm* — Zilka-Kotab, PC

(57) ABSTRACT

A method in one embodiment includes determining which elements of a storage environment or system have been selected for addition to a group, each of the elements being associated with a tier; adding the selected elements to the group; determining whether a parent of each of the selected elements has also been selected, the parent of each of the selected elements being in a higher tier than the element; adding the parent to the group as an element if the parent of any of the selected elements has not been selected; associating the elements in the group into subgroups; generating a view of at least some of the elements in the group, the view representing the tier of the elements in the view, the elements being spatially organized by subgroup; and outputting the view. Additional systems, methods and computer program products are also disclosed.

19 Claims, 5 Drawing Sheets

ASSEMBLY AND OUTPUT OF USER-DEFINED GROUPINGS

BACKGROUND

The present invention relates to data assembly and presentation, and more particularly, this invention relates to assembling and outputting defined groupings.

When users are permitted to group arbitrary sets of entities together in a sensible manner, it is often difficult to find a standard way to display all possible permutations of group members in a meaningful and user friendly form. This issue is often exacerbated when dealing with more complex entities, such as entities with varying tiers (e.g. levels, etc.) and entities with various classes and tiers. There is thus a need for addressing these and/or other issues.

SUMMARY

A method in one embodiment includes determining which elements of a storage environment or system have been selected for addition to a group, each of the elements being associated with a tier; adding the selected elements to the group; determining whether a parent of each of the selected elements has also been selected, the parent of each of the selected elements being in a higher tier than the element; adding the parent to the group as an element if the parent of any of the selected elements has not been selected; associating the elements in the group into subgroups; generating a view of at least some of the elements in the group, the view representing the tier of the elements in the view, the elements being spatially organized by subgroup; and outputting the view.

A computer program product according to another embodiment includes a computer usable medium having computer usable program code embodied therewith. The computer usable program code includes computer usable program code configured to determine which elements of a storage environment or system have been selected for addition to a group, each of the elements being associated with a tier; computer usable program code configured to add the selected elements to the group; computer usable program code configured to determine whether a parent of each of the selected elements has also been selected, the parent of each of the selected elements being in a higher tier than the element; computer usable program code configured to add the parent to the group as an element if the parent of any of the selected elements has not been selected; computer usable program code configured to associate the elements in the group into subgroups; computer usable program code configured to generate a view of at least some of the elements in the group, the view representing the tier of the elements in the view, the elements being spatially organized by subgroup; and computer usable program code configured to output the view.

A method according to yet another embodiment includes outputting a nested view of several hierarchically-tiered groups of elements of a storage environment or system, lower-tiered groups being nested in the higher-tiered groups associated therewith, wherein the groups are collapsible; detecting a selection of one of the elements by a user; outputting additional information about the selected one of the elements; receiving an instruction from the user to collapse or expand one of the subgroups; updating the view to show the one of the subgroups in an expanded or collapsed state; and outputting the updated view.

A computer program product in a further embodiment includes a computer usable medium having computer usable program code embodied therewith. The computer usable program code includes computer usable program code configured to output a view of several preselected elements of a system, each of the elements being associated with a tier, the elements being organized into subgroups in the view, wherein the subgroups are collapsible; computer usable program code configured to detect a selection of one of the elements by a user; computer usable program code configured to output additional information about the selected one of the elements; computer usable program code configured to receive an instruction from the user to collapse or expand one of the subgroups; computer usable program code configured to update the view to show the one of the subgroups in an expanded or collapsed state; and computer usable program code configured to output the updated view.

Other aspects and embodiments of the present invention will become apparent from the following detailed description, which, when taken in conjunction with the drawings, illustrate by way of example the principles of the invention.

DETAILED DESCRIPTION

Figure 1:
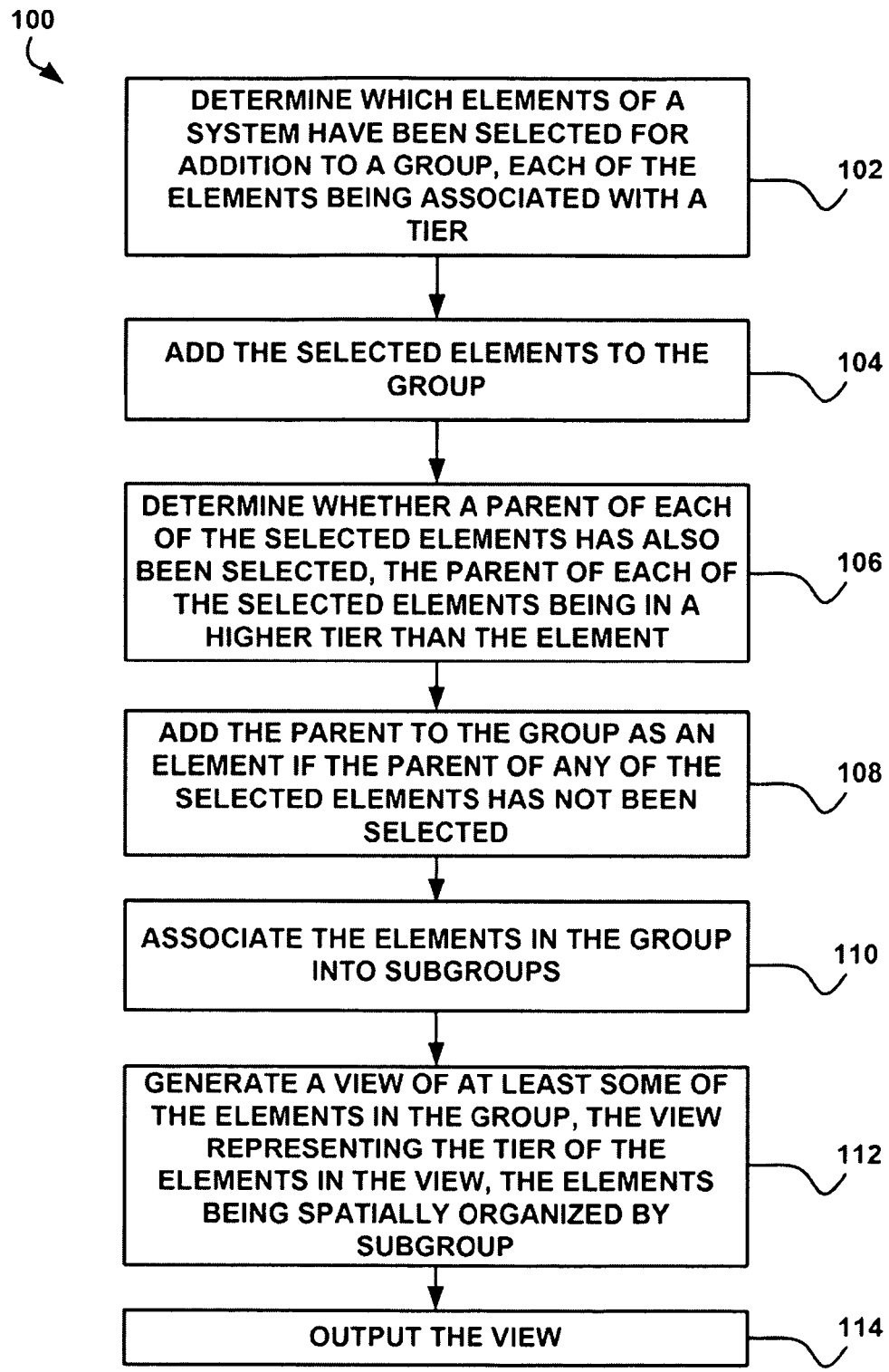
FIG. 1 shows a method for providing user-defined groupings, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description includes description of systems and methods for displaying information in an organized and user-friendly way. Particularly, the information is represented by elements organized into groups. If the information is further organized into a hierarchy of tiers, the hierarchy may also be output, e.g., the elements are represented in subgroups within each of the groups. Embodiments of the present invention utilize a hybrid map layout combining a hub-and-spoke map with collapsible grouping to display the relationships between the classes and tiers of elements within the group.

In one general embodiment, a method is provided. In operation, it is determined which elements of a storage environment or system have been selected for addition to a group, each of the elements being associated with a tier. Additionally, the selected elements are added to the group. Furthermore, it is determined whether a parent of each of the selected elements has also been selected, the parent of each of the selected elements being in a higher tier than the element. In addition, the parent to the group is added as an element if the parent of any of the selected elements has not been selected. Further, the elements in the group are associated into subgroups. Moreover, a view of at least some of the elements in the group is generated, the view representing the tier of the elements in the view, the elements being spatially organized by subgroup. Still yet, the view is output.

In another general embodiment, a computer program product for outputting a view is provided, the computer program product comprising a computer usable medium having computer usable program code embodied therewith. The computer usable program code includes computer usable program code configured to determine which elements of a storage environment or system have been selected for addition to a group, each of the elements being associated with a tier, computer usable program code configured to add the selected elements to the group, computer usable program code configured to determine whether a parent of each of the selected elements has also been selected, the parent of each of the selected elements being in a higher tier than the element, computer usable program code configured to add the parent to the group as an element if the parent of any of the selected elements has not been selected, computer usable program code configured to associate the elements in the group into subgroups, computer usable program code configured to generate a view of at least some of the elements in the group, the view representing the tier of the elements in the view, the elements being spatially organized by subgroup, and computer usable program code configured to output the view.

In another general embodiment, a method is provided. In operation, a nested view of several hierarchically-tiered groups of elements of a storage environment or system are output, lower-tiered groups being nested in the higher-tiered groups associated therewith, wherein the groups are collapsible. Additionally, a selection of one of the elements by a user is detected. Furthermore, additional information about the selected one of the elements is output. In addition, an instruction is received from the user to collapse or expand one of the subgroups. Moreover, the view is updated to show the one of the subgroups in an expanded or collapsed state. Still yet, the updated view is output.

In another general embodiment, a computer program product for outputting a view is provided, the computer program product comprising a computer usable medium having computer usable program code embodied therewith. The computer usable program code includes computer usable program code configured to output a view of several preselected elements of a storage environment or system, each of the elements being associated with a tier, the elements being organized into subgroups in the view, wherein the subgroups are collapsible, computer usable program code configured to detect a selection of one of the elements by a user, computer usable program code configured to output additional information about the selected one of the elements, computer usable program code configured to receive an instruction from the user to collapse or expand one of the subgroups, computer usable program code configured to update the view to show the one of the subgroups in an expanded or collapsed state, and computer usable program code configured to output the updated view.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions May also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a method 100 for providing user-defined groupings, in accordance with one embodiment. As shown, it is determined which elements of a system have been selected for addition to a group, each of the elements being associated with a tier. See operation 102.

In the context of the present description, a system refers to any system including one or more elements. For example, in various embodiments, the system may include a computer system, a software system, a file system, a data storage system, and/or any other system for that matter. Furthermore, in the context of the present description, elements refer to any component, object, computer code, or object representative that may be included in a system. For example, in various embodiments, the elements referred to herein may include physical objects, software objects, virtual objects, etc.

As an option, a user may be allowed to select the elements. As another option, the elements may be selected automatically. As still another option, the elements may be selected based on user preferences.

In one embodiment, the elements of the system may be detected. In various embodiments, this detection may include physical detection and/or virtual detection. For example, the detection may be performed by reviewing data from which the elements may be determined. In these cases, a database of system information may be provided for detecting elements in a system.

Once it is determined which elements of a system have been selected for addition to a group, the selected elements are added to the group. See operation 104. It is then determined whether a parent of each of the selected elements has also been selected. See operation 106.

In this case, the parent of each of the selected elements is in a higher tier than the element. In the context of the present description, a tier refers to a level or node of a system. In some cases, the tier may include a plurality of elements associated with one or more other tiers or levels. In these cases, the tier including the elements of the other tiers may be a higher tier (e.g. tier 1, etc.) than tiers associated with the elements that are included in the tier.

In one embodiment, determining whether the parent of each of the selected elements has also been selected may include analyzing all parents of the selected elements in all tiers above the tiers of the respective elements. In this case, a tier 1 element is in the highest tier, a tier 2 element is the second highest tier, etc. Once it is determined whether a parent of each of the selected elements has also been selected, the parent is added to the group as an element if the parent of any of the selected elements has not been selected. See operation 108.

The elements in the group are then associated into subgroups. See operation 110. In one embodiment, the elements in the groups may be associated into the subgroups by class. In this case, each of the elements may be grouped into or labeled as part of the subclass.

Furthermore, a view of at least some of the elements in the group is generated. See operation 112. In this case, the view represents the tier of the elements in the view, where the elements are spatially organized by subgroup. Additionally, each subgroup may contain one or more element.

Once the view of at least some of the elements in the group is generated, the view is outputted, e.g., to a display device such as a computer monitor, etc. See operation 114. It should be noted that this view may not necessarily represent a default view.

Furthermore, the view may include a number of representations and/or layouts. For example, in one embodiment, the view may include a hub and spoke map connecting the subgroups. In this case, each of the subgroups may be collapsible.

In addition to outputting the view, in one embodiment, a representation of the elements in the system may be outputted. The representation may include any representation, such as a list, a graphical representation, a data flow, etc. In this case, the representation may be outputted to a user selecting the one or more elements from the representation.

For example, the representation may be outputted as a window or an interface displayed to the user. As an option, representations of all of the selected elements may be output in the view of at least some of the elements in the group. As another option, representations of all of the elements in the group may be output in the view.

As still another option, the view of at least some of the elements in the group may include elements associated with a particular tier and elements of a lower tier may have a parent in the particular tier that was not selected by the user. For example, if a first tier is being shown, the selected elements in the first tier may be displayed, along with one or more selected elements in a lower tier. To place a lower-tiered element in a context, its parent in the first tier may also be shown, even though that parent may or may not have been selected by the user.

Thus, the elements of the lower tier having the parent in the particular tier that was not selected by the user may be shown in a subgroup of elements associated with the parent that was not selected by the user. In one embodiment, a user selection of one of the elements may be received from the outputted view. In this case, a second view of at least some of the elements associated with the element selected from the view may be generated.

Figure 2:
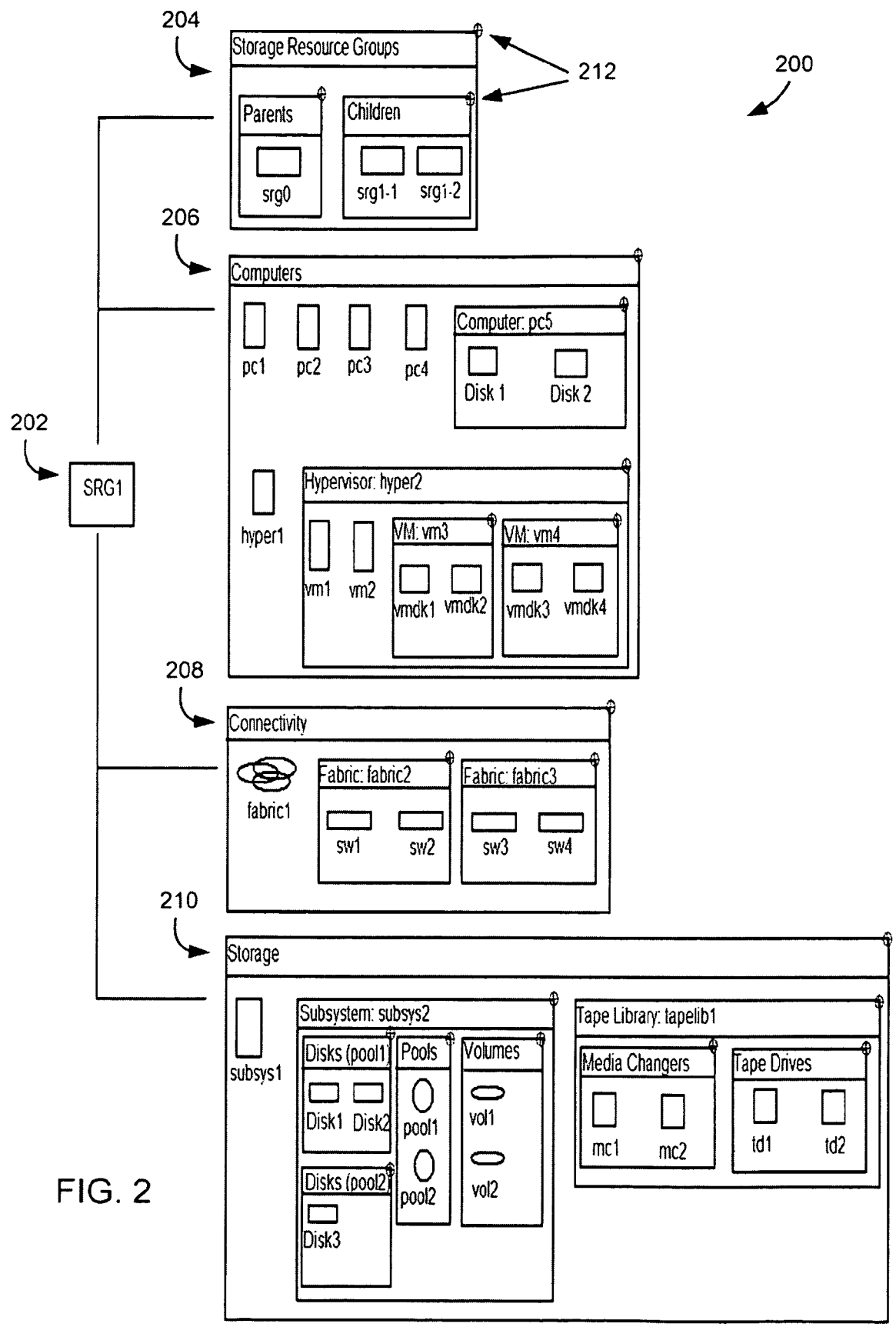
FIG. 2 shows an interface for providing user-defined groupings, in accordance with one embodiment.
Figure 3:
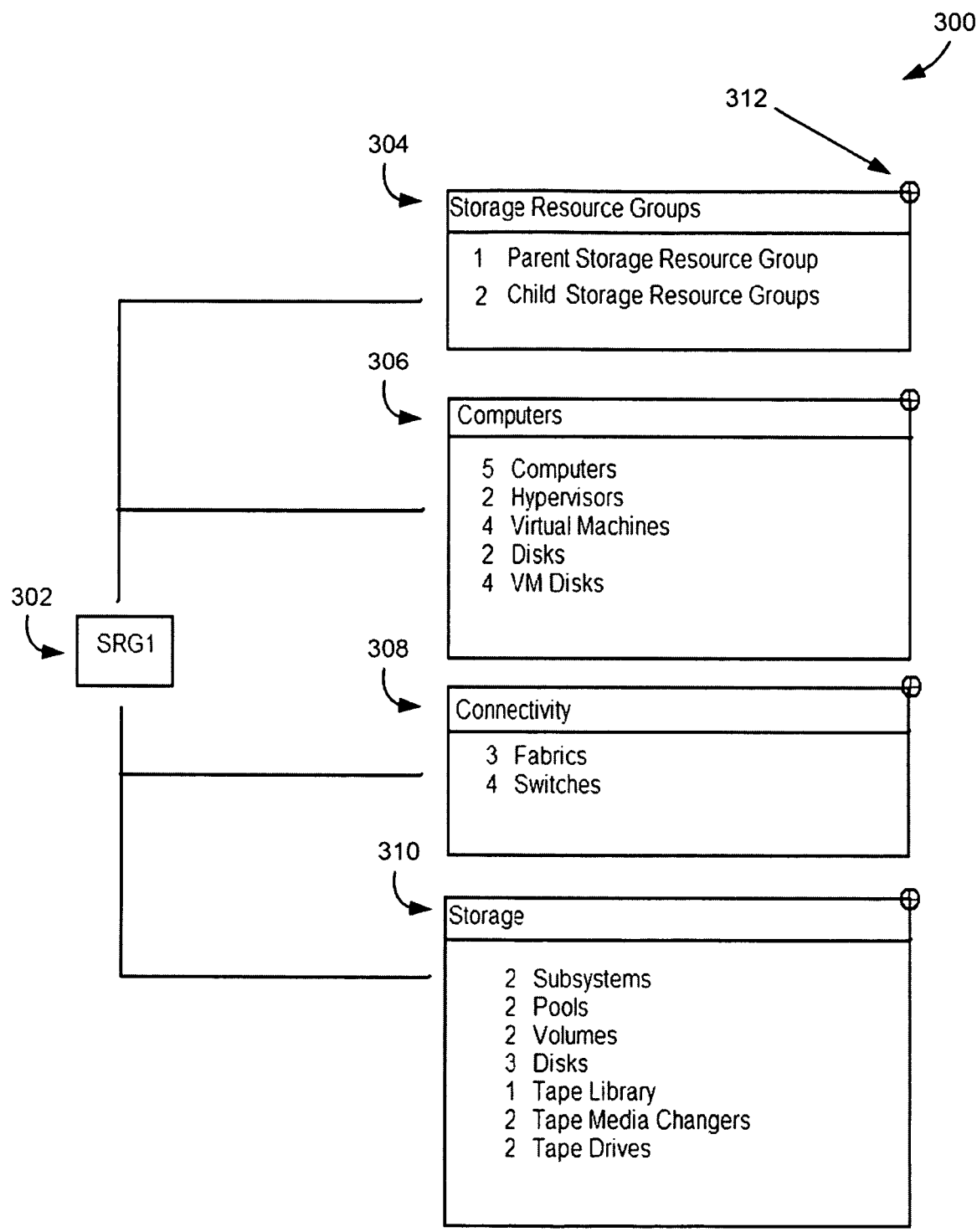
FIG. 3 shows an interface illustrating a collapsed view of the interface of FIG. 2, in accordance with one embodiment.

Using these techniques, a hybrid map layout combining a hub and spoke map with a collapsible grouping may be utilized to adequately display relationships between classes and tiers of elements within a group. Thus, users may group arbitrary sets of entities together in a user sensible, standard manner, such that all possible permutations of group members may be displayed in a meaningful form. This may be accomplished even when the entities are of varying tiers. Any type of graphical user interface (GUI) may be used to enable the user to create, modify, and/or view the hybrid map layout. FIGS. 2 and 3 show illustrative layouts, though other types of layouts will be readily apparent to those skilled in the art upon being apprised of the teachings herein. Elements may be assigned to a group and/or tier using any method, including drag-and-drop, designation of properties of the element, etc. Moreover, elements may belong to more than one group and/or tier in some approaches.

In one illustrative embodiment for outputting information about a storage environment (e.g., storage system, including peripheral hardware and software), a storage area network (SAN) storage subsystem may be a tier 1 (i.e. a highest level element). In this case, a storage pool inside of that storage subsystem would be a tier 2 (i.e. a secondary element). Furthermore, a data volume inside of that storage pool would be a tier 3 (i.e. tertiary element), etc.

This may become more complicated when each grouping includes entities of various classes and tiers. For example, a physical or virtual computer system or cluster of computers may be a "Host" class of element. Additionally, a fibre-channel switch along with blades and ports associated with the switch may be a "Fabric" class of element. A SAN storage subsystem, network attached storage (NAS) filer, or tape library may be a "Storage" class of element.

One technique of displaying the group members is to use a tree view. The tree view makes it easy to see the different tiers of entities. However, a tree view is not able to show the relationships between different classes of elements in the same group. For example, a tree view is unable to show relationships between a "storage" class and a "connectivity" class.

In some hub-and-spoke style map views, the views may either show all the different tiers on the same map, or call for the user enter to a tier 1 element to find the lower tiers of elements. In these cases, if all the different tiers are placed onto the same map in this hub-and-spoke style, the parent/child nature of the relationship of all the various tiers may become unclear.

In one embodiment, a representation and visualization of this type of grouping may be accomplished utilizing a map style view. For example, the information may be displayed such that the parent/child relationships of the various tiers within the same class of entity are clear, all the entities are visible on the same map, the relationships between the various classes of entities (if they exist) are visible, and various sets of meta information may be conveyed to the user for each tier and class of entity (e.g. alert status, health status, performance status, etc.).

Accordingly, in one embodiment, a map with the addition of containment notions to adequately represent the various tiers may be utilized. This map may be constructed in such a way that the containment is conditional upon lower level tiers actually being a member of the group. In this way, a user may have ultimate-flexibility of what appears on the map. Furthermore, if a tier 3 element is added to a group, the map may display not only the tier 3 element, but also a parent, tier 2 and tier 1 elements.

FIG. 2 shows an interface 200 for providing user-defined groupings, in accordance with one embodiment. As an option, the present interface 200 may be implemented in the context of the details of FIG. 1. Of course, however, the interface 200 may be implemented in any desired environment.

As shown, a first storage resource group (SRG1) 202 an associated contents are displayed. In the context of the present description, the term "storage resource group" is used to represent a grouping of entities of varying types. In the current example, the first storage resource group 202 includes four classes of elements including storage resource groups class 204 (e.g. groups within groups, etc.), a computers class 206, a connectivity class 208, and a storage class 210.

It should be noted that, in the storage resource groups class 204, there is a distinction made between other groups (e.g. parents, etc.) that include the storage resource group being focused on in this view (i.e. SRG1 202), and between other groups (e.g. children, etc.) that are included within the storage resource group that is the focus of the interface 200 (i.e. SRG1 202). Selecting (e.g. double-clicking, etc.) any storage resource group icon displayed using the interface 200 may bring the user to focus on the selected storage resource group.

The various classes 204-210 may be defined as members of the first storage resource group 202 in a variety of ways. For example, the computer class 206 of elements may be defined as members of the first storage resource group 202 as illustrated in Table 1.

TABLE 1

| SRG1 |
| --- |
| Computer: pc1 |
| Computer: pc2 |
| Computer: pc3 |
| Computer: pc4 |
| Disk: Disk1 |
| Disk: Disk2 |
| Computer: Hyper1 |
| Computer: Hyper2 |
| Computer: vm1 |
| Computer: vm2 |
| Vmdisk: vmdk1 |
| Vmdisk: vmdk2 |
| Computer: vm4 |
| Vmdisk: vmdk3 |
| Vmdisk: vmdk4 |

In this case, the computer "pc5," a tier 1 element, is not an explicit member of the group, but it is still added to the map in order to give context to the display of Disk1 and Disk2, which are tier 2 elements. Likewise, the virtual machine "vm3," a tier 2 element, is not an explicit member of the group. However, the virtual machine "vm3" is still added to the interface 200 (i.e. the map) in order to give context to the display of "vmdk1" and "vmdk2," which are tier 3 elements under vm3 and hypervisor "hyper2" tiers in this case. Thus, elements that give context to other elements may be automatically added to the group based on system data, e.g., which contextual elements are associated in a hierarchical or other way with the elements for which the context is desired.

As an option, a visual marker may be utilized on a multi-function icon in the map to aide the distinction between the explicit and implicit members of the group. As another option, an implicit member of the group (e.g. added for context of another child explicit member, etc.) may always be in the form of a grouping box. In this case, an explicit member may be in the form of a grouping box as well as a single multi-function icon.

In one embodiment, if a tier 1 element does not have a child, tier 2 or 3 elements may be added to the same group. In this case, the tier 1 element may appear merely as a single icon on the map. However, if there are child tier 2 or 3 elements added to the same group, that tier 1 element may then be displayed as a collapsible group. In this way, the children of the tier 1 element may be displayed with the tier 1 collapsible group.

In one embodiment, a button may be included on each element representation or grouping displayed such that the element, grouping, and/or tier associated with that element may be collapsed or expanded. For example, a button 212 may be provided for each grouping.

As an option, all groupings may start out collapsed, so as not to immediately clutter the display. To preserve processing power and memory, the contents of each collapsed grouping may not be presented to the user interface until expanded by the user (e.g. "lazy loading" of data, etc.).

FIG. 3 shows an interface 300 illustrating a collapsed view of the interface 200 of FIG. 2, in accordance with one embodiment. As an option, the present interface 300 may be implemented in the context of the details of FIGS. 1-2. Of course, however, the interface 300 may be implemented in any desired environment.

As shown, the interface 300 illustrates a collapsed view of a map including a first storage resource group (SRG1) 302. The first storage resource group 202 includes four classes of elements including storage resource groups class 304, a computers class 306, a connectivity class 308, and a storage class 310, all in a collapsed state. In this case, the contents of each collapsed grouping may not be presented to the user interface until expanded by a user. As an option, the user may use a button 312 to expand each grouping.

By enabling the display of groupings in this manner, the groupings may be configured to model the infrastructure components of business applications. Furthermore, a health status of a business application may be at least partially deduced from the health and performance status of any infrastructure components. Additionally, all infrastructure components for a particular application may be visible on a single map view. Still yet, various levels (i.e. tiers) of elements may be added to the same group, depending solely on the responsibility and interest of the user (e.g. an administrator, etc.) managing the group and not on any physical relationship between elements and/or the groups.

Figure 4:
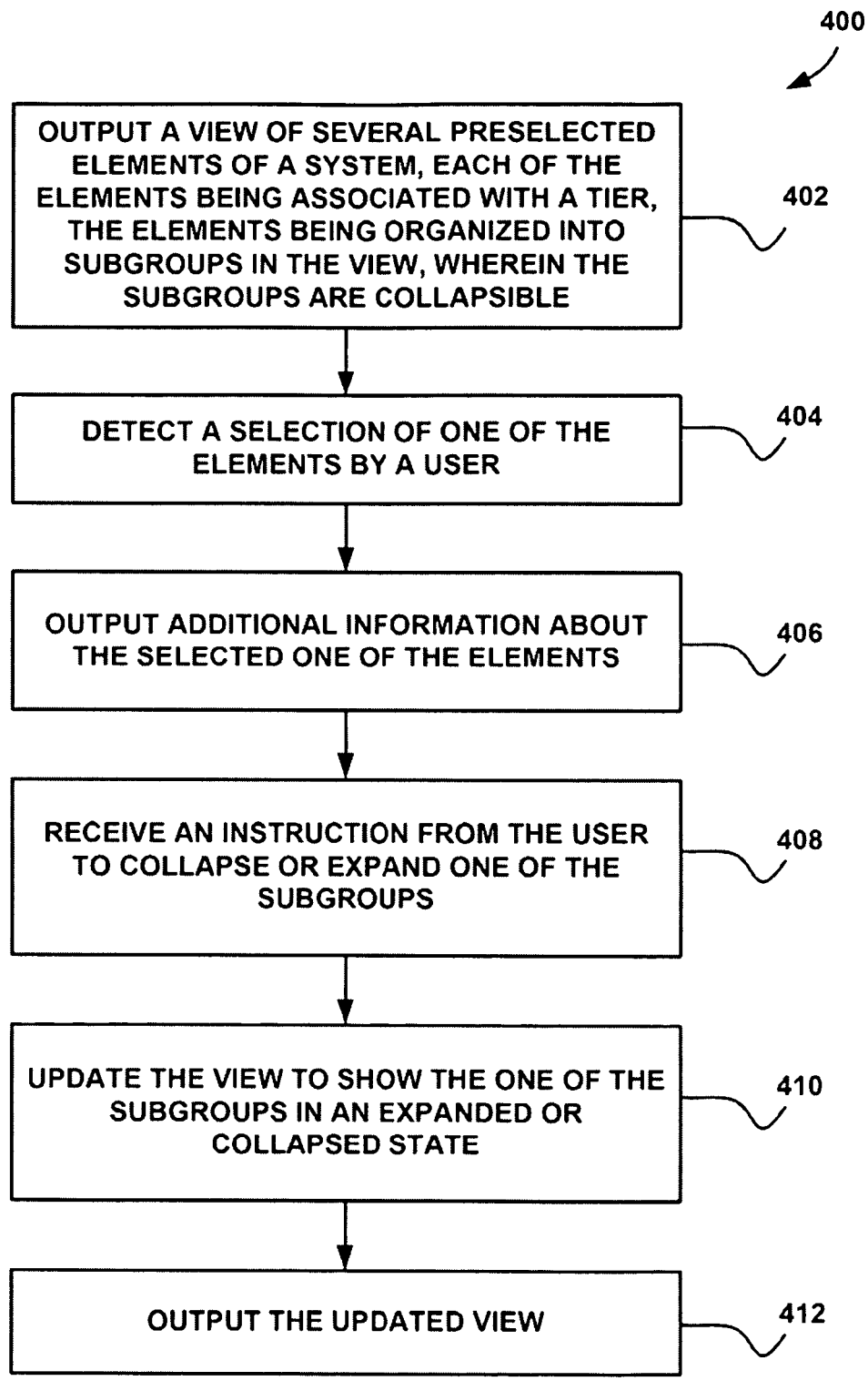
FIG. 4 shows a method for providing user-defined groupings, in accordance with another embodiment.

FIG. 4 shows a method 400 for providing user-defined groupings, in accordance with another embodiment. As an option, the present method 400 may be implemented in the context of the functionality and architecture of FIGS. 1-3. Of course, however, the method 400 may be carried out in any desired environment.

As shown, a view of several preselected elements of a system is output. See operation 402. In this case, each of the elements is associated with a tier and the elements are organized into subgroups in the view. Furthermore, the subgroups are collapsible.

A selection of one of the elements by a user is then detected. See operation 404. Once the selection by the user is detected, additional information about the selected one of the elements is output. See operation 406.

An instruction is then received from the user to collapse or expand one of the subgroups. See operation 408. In various embodiments, this instruction may be in the form of a mouse input (e.g. a mouse click, etc.), a keyboard input, a touch screen input, and/or various other inputs.

Once this instruction is received, the view is updated to show the one of the subgroups in an expanded or collapsed state. See operation 410. The updated view is then output. See operation 412.

In one embodiment, the view may include a hub and spoke map connecting the subgroups. Furthermore, the view may include elements associated with a particular tier. In this case, the elements of a lower tier may have a parent in the particular tier that was not preselected.

Figure 5:
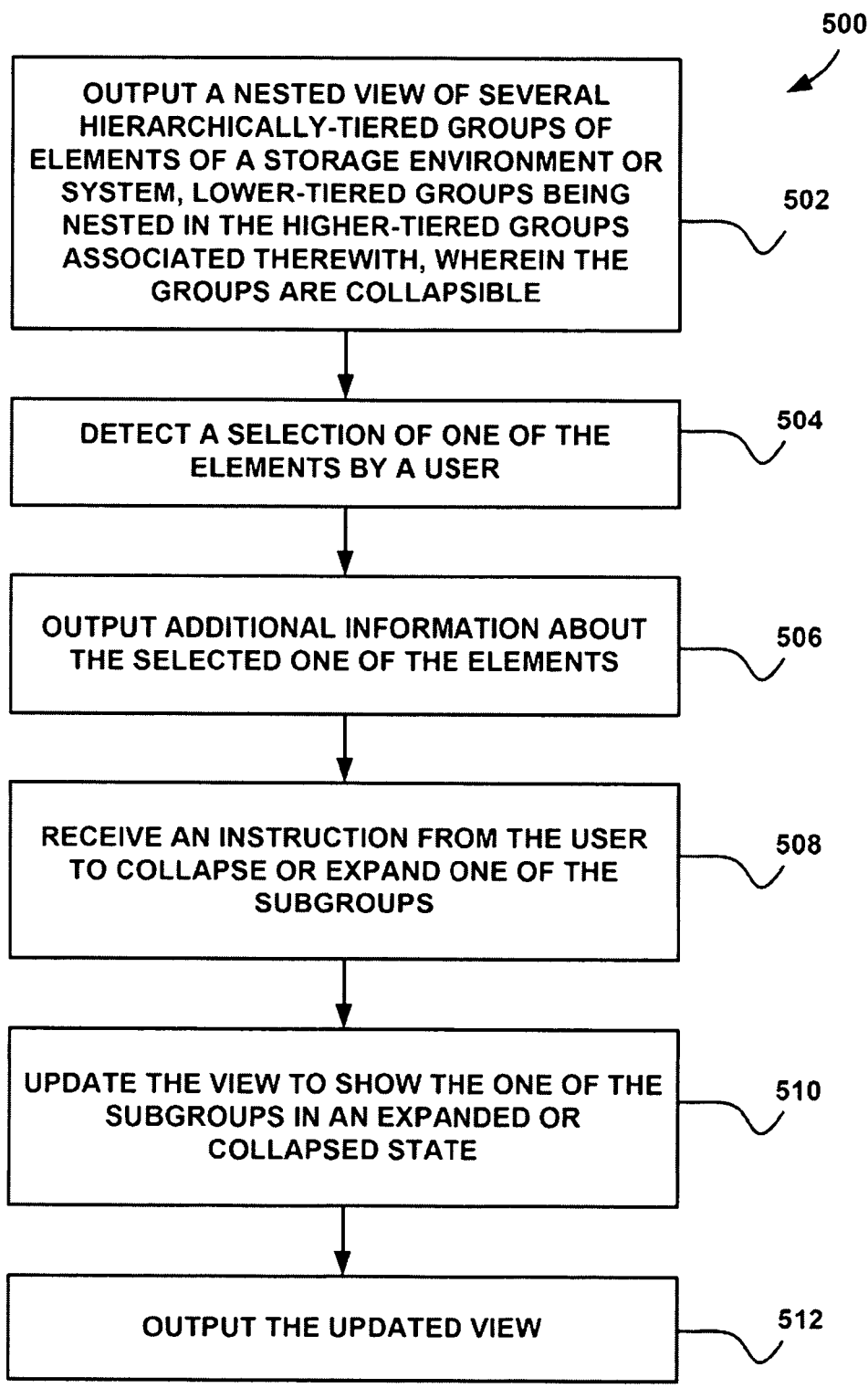
FIG. 5 shows a method for providing user-defined groupings, in accordance with another embodiment.

FIG. 5 shows a method 500 for providing user-defined groupings, in accordance with another embodiment. As an option, the present method 500 may be implemented in the context of the functionality and architecture of FIGS. 1-4. Of course, however, the method 500 may be carried out in any desired environment.

As shown, a nested view of several hierarchically-tiered groups of elements of a storage environment or system is output in operation 502. Lower-tiered groups are nested in the higher-tiered groups associated therewith. Furthermore, the subgroups are collapsible.

A selection of one of the elements by a user is detected. See operation 504. Once the selection by the user is detected, additional information about the selected one of the elements is output. See operation 506.

An instruction is then received from the user to collapse or expand one of the subgroups. See operation 508. In various embodiments, this instruction may be in the form of a mouse input (e.g. a mouse click, etc.), a keyboard input, a touch screen input, and/or various other inputs.

Once this instruction is received, the view is updated to show the one of the subgroups in an expanded or collapsed state. See operation 510. The updated view is then output. See operation 512.

In one embodiment, the view may include a hub and spoke map connecting the subgroups. Furthermore, the view may include elements associated with a particular tier. In this case, the elements of a lower tier may have a parent in the particular tier that was not preselected.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

determining, using a processor of a computer, which elements of a storage environment or system have been selected for addition to a group, each of the elements being independently associated with a tier;

adding the selected elements to the group as elements of the group; determining whether a parent of each of the selected elements has also been selected, the parent of each of the selected elements being in a higher tier than the element;

adding the parent to the group as an element of the group when the parent of any of the selected elements has not been selected;

determining whether an element associated with one or more of the selected elements which gives context to the one or more of the selected elements has also been selected;

adding the element which gives the context as an element of the group when the element that gives the context has not been selected;
associating the elements in the group into subgroups;
generating a view of at least some of the elements in the group, the view representing:
a tier of each of the elements in the view; and the elements spatially organized by subgroup wherein each element associated with one or more of the selected elements which gives context to the one or more of the selected elements is indicated with a visual marker to aide in distinguishing between explicit and implicit members of the group; and outputting the view;
wherein the elements include at least one of virtual machines and hypervisors, wherein the view comprises a hybrid map layout combining a hub spoke map with a collapsible grouping showing relationships between each subgroup thereof, and wherein each of the subgroups is collapsible in the map layout.

2. A method as recited in claim 1, further comprising allowing a user to select the elements for addition to the group.

3. A method as recited in claim 2, further comprising detecting the elements of the storage environment or system.

4. A method as recited in claim 3, further comprising outputting a representation of the elements in the storage environment or system, the user selecting the one or more elements from the representation.

5. A method as recited in claim 1, wherein determining whether the parent of each of the selected elements has also been selected includes analyzing all parents of the selected elements in each successively higher tier above the tiers of the respective elements until a highest tier is reached, wherein each tier is a level and/or node of the system configured to include at least one of: one or more elements and one or more lower tiers.

6. A method as recited in claim 1, wherein the elements include at least one of data storage devices, storage pools, and data volumes, wherein subgroups are spatially, organized by class of elements within the subgroups, wherein elements are allowed to belong in one or more groups and/or subgroups thereof and/or one or more tiers wherein the hybrid map layout is configured to display elements in each group, subgroup and/or tier to which the element belong,
wherein the hybrid map layout is configured to be manipulated by a user to group arbitrary sets of entities together such that all possible permutations of group members is displayable.

7. A method as recited in claim 1, wherein the elements include at least one of network attached storage (NAS) and a storage area network (SAN) storage subsystem, and wherein a nested view of several hierarchically-tiered groups of hardware and/or software elements of a storage environment or system is output, lower-tiered groups being nested in the higher-tiered groups associated therewith.

8. A method as recited in claim 1, wherein the elements include a hypervisor, wherein the view includes a hub and spoke map connecting the subgroups with containment notions to represent various tiers of each of the elements in the view, wherein containment is conditional upon lower level tiers being a member of the group, wherein each of the subgroups is collapsible; and further comprising receiving a user selection of one of the elements from the view and generating a second view of at least some of the elements associated with the element selected from the view, and automatically adding unselected elements that give context to other elements to the group.

9. A method as recited in claim 1, wherein the elements in the group are organized into subgroups by class; and further comprising determining how many elements are in each subgroup within each class; and displaying, for each class, numerical representations of how many elements are in each subgroup within the class near labels corresponding to each subgroup within the class when the view is collapsed.

10. A method as recited in claim 1, wherein the view includes elements associated with a particular tier and elements of a lower tier having a parent in the particular tier that was not selected by the user.

11. A method as recited in claim 10, wherein the elements of the lower tier having the parent in the particular tier that was not selected by the user are shown in a subgroup of elements associated with the parent that was not selected by the user.

12. A method as recited in claim 1, wherein the view includes a hybrid map layout combining a hub and spoke map with a collapsible grouping showing relationships between classes and tiers of elements within the group.

13. A method as recited in claim 12, wherein each of the subgroups is expandable in the view when initially output in order to provide additional information about elements within the subgroups, and collapsible once expanded to hide the additional information about elements within the subgroups.

14. A method as recited in claim 1, further comprising receiving a user selection of one of the elements from the view and generating a second view of at least some of the elements associated with the element selected from the view, wherein the at least some of the elements associated with the element selected from the view are spatially organized by subgroup in the second view, wherein a numerical representation of how many elements are in each subgroup is displayed near a label for each subgroup when the second view is collapsed.

15. A computer program product, the computer program product comprising:
a non-transitory computer usable medium having computer usable program code embodied therewith, the computer usable program code comprising:
computer usable program code configured to determine which elements of a storage environment or system have been selected for addition to a group, each of the elements being associated with a tier;
computer usable program code configured to add the selected elements to the group;
computer usable program code configured to determine whether a parent of each of the selected elements has also been selected, the parent of each of the selected elements being in a higher tier than the element;
computer usable program code configured to add the parent to the group as an element when the parent of any of the selected elements has not been selected;
computer usable program code configured to associate the elements in the group into subgroups by class;
computer usable program code configured to determine how many elements are in each subgroup within each class;
computer usable program code configured to generate a view of at least some of the elements in the group, the view representing the tier of the elements in the view, the elements being spatially organized within each class by subgroup; and
computer usable program code configured to output the view, wherein, for each class, numerical representations of how many elements are in each subgroup within the class are displayed near labels corresponding to each subgroup within the class when the view is collapsed, and wherein each unselected parent is indicated with a visual marker to aide in distinguishing between explicit and implicit members of the group; wherein the elements include at least one of virtual machines and hypervisors, wherein the view comprises a hybrid map layout combining a hub spoke map with a collapsible grouping showing relationships between each subgroup thereof, and wherein each of the subgroups is collapsible in the map layout.

16. A method, comprising:

outputting a nested view of several hierarchically-tiered groups of hardware and software elements of a storage environment or system, lower-tiered groups being nested in the higher-tiered groups associated therewith, wherein the groups are expandable when initially displayed, and collapsible thereafter, wherein numerical representations of how many elements are in each lower-tiered group are displayed near a label for each lower-tiered group when an associated upper-tier group is collapsed; detecting a selection of one of the elements by a user;

outputting additional information about the selected one of the elements; receiving an instruction from the user to collapse or expand one of the groups;

updating the view to show tile one of the groups in an expanded or collapsed state; and outputting the updated view; wherein the elements include at least one of virtual machines and hypervisors, wherein the view comprises a hybrid map layout combining a hub spoke map with a collapsible grouping showing relationships between each subgroup thereof, and wherein each of the subgroups is collapsible in the map layout.

17. A method as recited in claim 16, wherein the view includes a hub and spoke map connecting the groups, wherein the elements include a hypervisor, wherein the upper-tier groups are classes of the hardware and software elements of the storage environment or system.

18. A method as recited in claim 16, wherein the view includes elements associated with a particular tier and elements of a lower tier having a parent in the particular tier that was not preselected, and further comprising receiving a user selection of one of the elements from the view and generating a second view of at least some of the elements associated with the element selected from the view, and automatically adding unselected elements that give context to other elements to the one of the groups.

19. A computer program product, the computer program product comprising: a non-transitory computer usable medium having computer usable program code embodied therewith, the computer usable program code comprising:

computer usable program code configured to output a view of several preselected hardware and software elements of a storage environment or system, each of the elements being associated with a tier, the elements being organized into subgroups in the view, wherein the subgroups are collapsible, wherein the elements include a hypervisor, wherein the elements include at least one of network attached storage (NAS) and a storage area network (SAN) storage subsystem;

computer usable program code configured to detect a selection of one of the elements by a user;

computer usable program code configured to output additional information about the selected one of the elements;

computer usable program code configured to receive an instruction from the user to collapse or expand one of the subgroups;

computer usable program code configured to automatically add unselected elements, that give context to at least one of the selected elements, to the one of the subgroups, wherein the automatically added elements include parents of the at least one of the selected elements that were not previously selected and elements in a same class as the at least one of the selected elements: and wherein each unselected element that gives context to the at least one of the selected elements is indicated with a visual marker to aide in distinguishing between explicit and implicit members of the group;

computer usable program code configured to update the view to show the one of the subgroups in an expanded or collapsed state;

computer usable program code configured to output the updated view as a hub and spoke map connecting the subgroups; and computer usable program code configured to receive a user selection of one of the elements from the view and generate a second view of at least some of the elements associated with the element selected from the view; wherein the elements include at least one of virtual machines and hypervisors, wherein the view comprises a hybrid map layout combining a hub spoke map with a collapsible grouping showing relationships between each subgroup thereof, and wherein each of the subgroups is collapsible in the map layout.

* * * * *